US012770618B2

(12) United States Patent
Sekine

(10) Patent No.: US 12,770,618 B2
(45) Date of Patent: Oct. 20, 2026

(54) EXPLANATION ASSISTING SYSTEM

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 138 days.

(21) Appl. No.: 18/716,929

(22) PCT Filed: Nov. 8, 2022

(86) PCT No.: PCT/JP2022/041562
§ 371 (c)(1),
(2) Date: Jun. 5, 2024

(87) PCT Pub. No.: WO2023/106014
PCT Pub. Date: Jun. 15, 2023

(65) Prior Publication Data
US 2024/0412731 A1 Dec. 12, 2024

(30) Foreign Application Priority Data
Dec. 6, 2021 (JP) ................................ 2021-198060

(51) Int. Cl.
*G10L 15/08* (2006.01)
*G06F 40/279* (2020.01)
(Continued)

(52) U.S. Cl.
CPC ............ *G10L 15/22* (2013.01); *G06F 40/279* (2020.01); *G10L 15/08* (2013.01); *G10L 15/30* (2013.01);
(Continued)

(58) Field of Classification Search
None
See application file for complete search history.

(56) References Cited

U.S. PATENT DOCUMENTS 8,527,263 B2 * 9/2013 Bradley .................. G06F 40/56 455/414.3
12,164,876 B2 * 12/2024 Hashimoto ......... G06F 16/3344
(Continued)

FOREIGN PATENT DOCUMENTS

JP 2004-212895 A 7/2004
JP 2014-75066 A 4/2014
(Continued)

OTHER PUBLICATIONS

JPO Decision to grant a patent for JP2023001222 dated Aug. 20, 2024. (Year: 2024).*
(Continued)

*Primary Examiner* — Richard Z Zhu
(74) *Attorney, Agent, or Firm* — Pyprus Pte Ltd; George Liu

(57) ABSTRACT

This explanation supporting system 1, which uses a computer, comprises: an explanation material storing unit 3 that stores explanation materials; an audio input unit 5 to which audio is inputted; an audio analyzing unit 7 that analyzes the terms included in the audio and acquires audio terms; and an output control unit 9 that outputs displayed information. The explanation material storing unit 3 stores, in association with keywords, explanation information included in the explanation materials. The explanation supporting system 1 further comprises a question inputting unit 13 that is connected to audience terminals 11 to receive questions from the audience terminals 11. The output control unit 9 uses keywords, which are included in those ones of the audio terms analyzed by the audio analyzing unit 7 which are the audio terms prior to the reception of the questions from the question inputting unit 13, to read out the explanation information associated with the keywords from the explanation material storing unit 3,
(Continued)

and then outputs the read-out explanation information to the audience terminals 11.

12 Claims, 4 Drawing Sheets

(51) Int. Cl.
*G10L 15/22* (2006.01)
*G10L 15/30* (2013.01)
*G06F 40/289* (2020.01)
*G06F 40/295* (2020.01)

(52) U.S. Cl.
CPC .......... *G06F 40/289* (2020.01); *G06F 40/295* (2020.01); *G10L 2015/088* (2013.01); *G10L 2015/221* (2013.01); *G10L 2015/223* (2013.01); *G10L 2015/227* (2013.01)

(56) References Cited

U.S. PATENT DOCUMENTS

2015/0294151 A1* 10/2015 Kobayashi ............. G06V 40/20 382/103
2016/0196491 A1* 7/2016 Chandrasekaran ..... G06F 16/26 706/50
2016/0239489 A1* 8/2016 Cunico ................. G06F 16/284
2018/0197430 A1* 7/2018 Apokatanidis .......... G06F 40/56
2019/0214023 A1* 7/2019 Ihara ...................... H04R 1/406
2019/0287415 A1* 9/2019 Zavesky .................. G09B 7/00
2021/0286949 A1* 9/2021 Hashimoto ........... G06F 3/0488
2021/0357441 A1* 11/2021 Zhuo ................... G06F 16/3322
2021/0365500 A1* 11/2021 Gunaselara ........... G06F 16/951
2022/0405484 A1* 12/2022 Kanchibhotla ....... G06F 40/137
2023/0410795 A1* 12/2023 Chiba .................... G09B 7/077

FOREIGN PATENT DOCUMENTS

JP 2016-25545 A 2/2016
JP 2021-86389 A 6/2021
JP 2021-121505 A 8/2021

OTHER PUBLICATIONS

Amended claims in JP2023001222 dated May 18, 2024. (Year: 2024).*
International Search Report of International Patent Application No. PCT/JP2022/041562 completed on Nov. 29, 2022 and mailed Dec. 13, 2022 (4 pages).
Written Opinion of International Patent Application No. PCT/JP2022/041562 completed on Nov. 29, 2022 and mailed Dec. 13, 2022 (3 pages).

* cited by examiner

[FIG. 1]
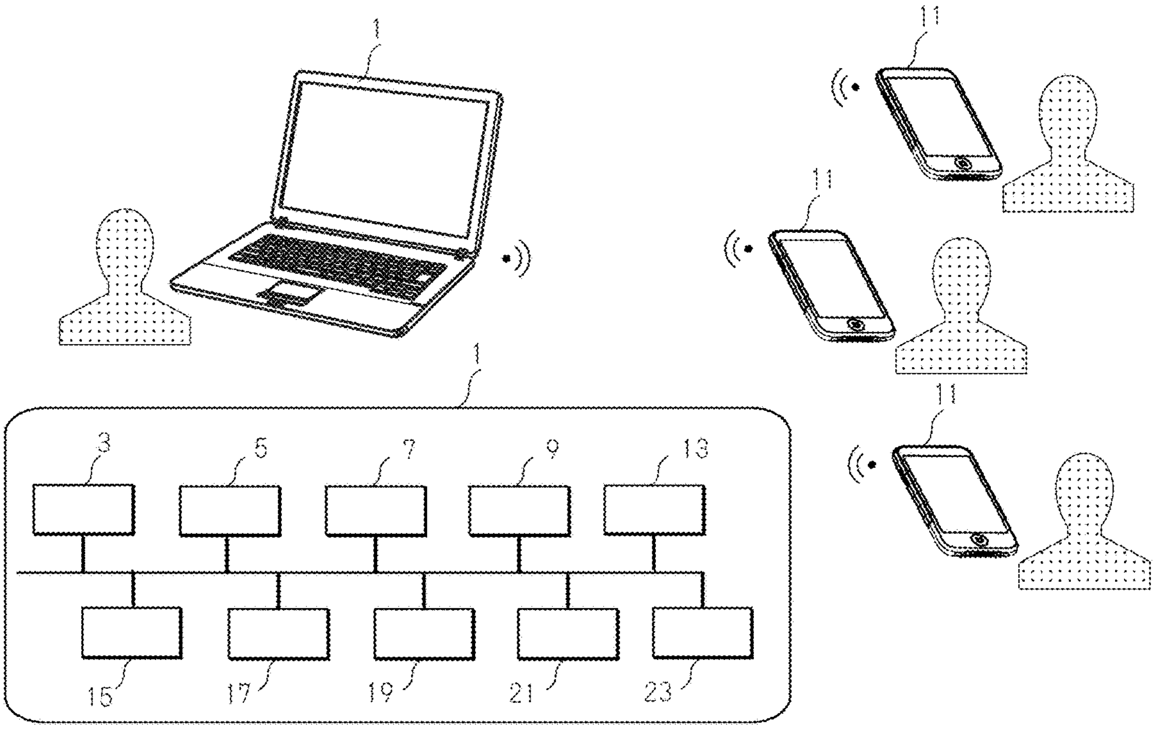

[FIG. 2]
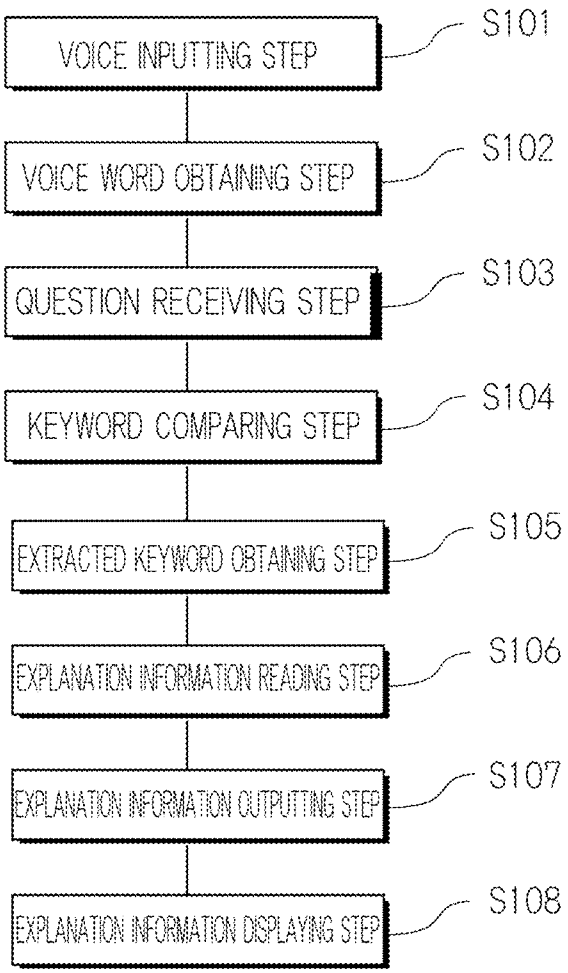

[FIG.3]
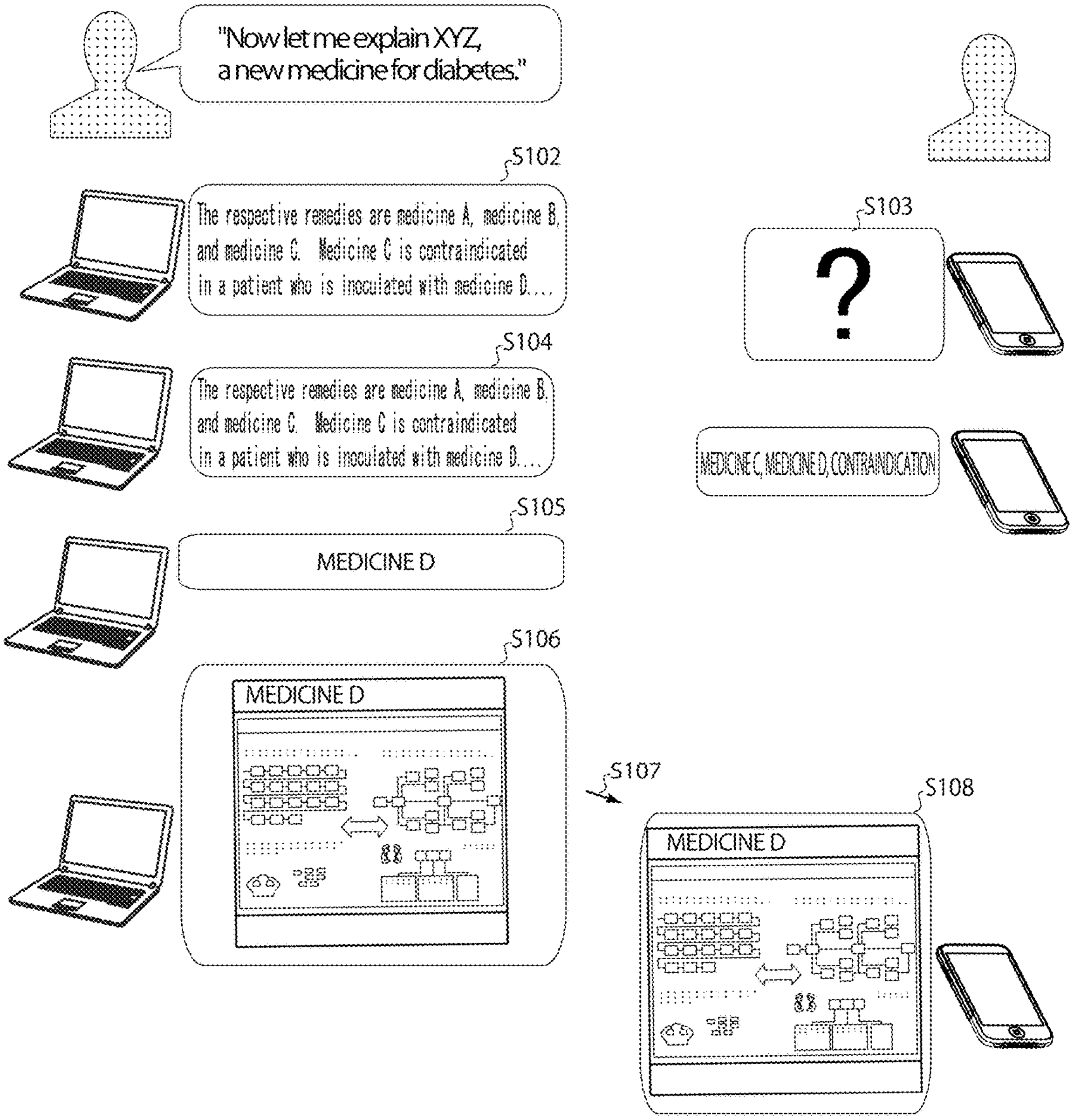

[FIG. 4]
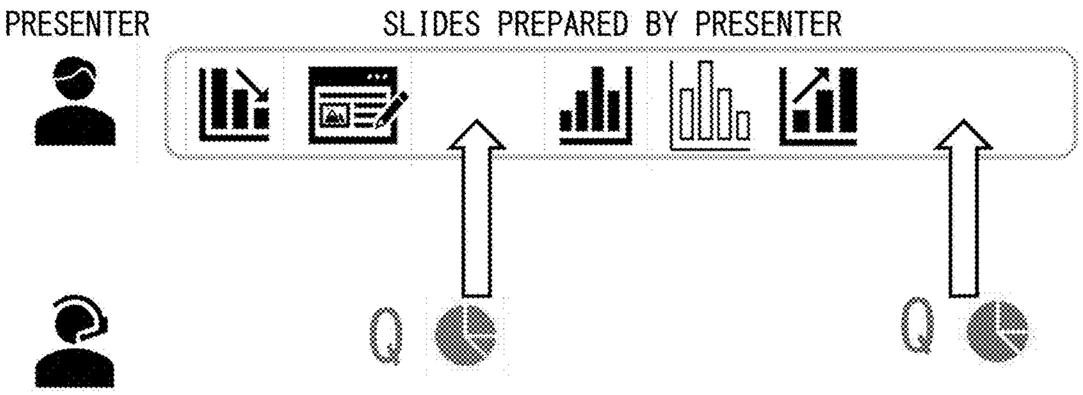
[FIG. 5]
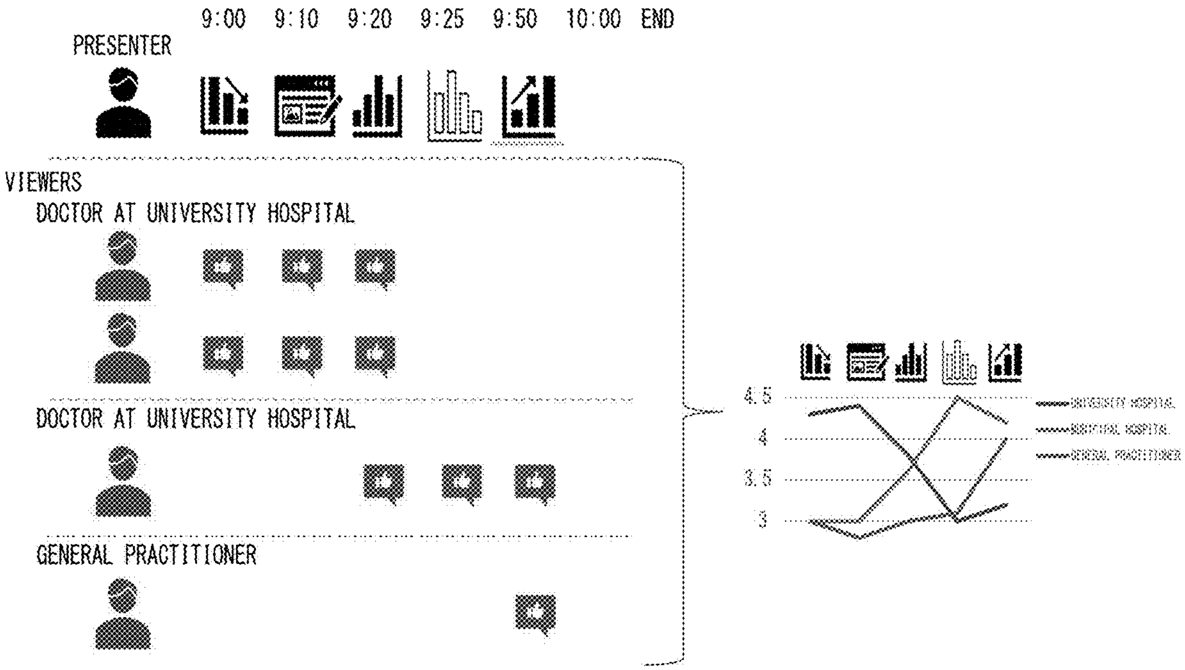

EXPLANATION ASSISTING SYSTEM

TECHNICAL FIELD

The present invention relates to an explanation assisting system. In more detail, the present invention relates to an explanation assisting system that can resolve a point in question during an explanation.

JP 2021-86389 A describes a communication system. This system enables, in a video conference, a presenter to easily select an audience member who desires to participate in the video conference, to allow the audience member to participate in a discussion.

CITATION LIST

Patent Literature

Patent Literature 1: JP 2021-86389 A

SUMMARY OF INVENTION

Technical Problem

With a conventional explanation assisting system, a lecture or a presentation will proceed even when an audience member has a question. On the other hand, when a talker responds to the question from the audience member, the lecture or the presentation is suspended.

Solution to Problem

The problems described above are solved basically in such a manner that a system receiving a notice that an audience member has put a question about a part in an explanation sends, to the audience member, explanation information about a part previous to the part in the explanation about which the audience member has put the question.

The present invention relates to an explanation assisting system 1 using a computer.

This system includes an explanation material storage unit 3, a voice input unit 5, a voice analysis unit 7, an output control unit 9, and a question input unit 13. This system may further include at least any one of an output explanation information storage unit 15, an output explanation information output unit 17, an evaluation information input unit 19, an audience attribute storage unit 21, and an evaluation analysis unit 23.

The explanation material storage unit 3 is an element that stores an explanation material. The explanation material storage unit 3 further stores explanation information included in the explanation material in association with keywords.

The voice input unit 5 is an element into which a voice is input.

The voice analysis unit 7 is an element for analyzing words included in a voice to obtain voice words.

The output control unit 9 is an element for outputting information to be displayed.

The question input unit 13 is an element for receiving a question from an audience terminal 11 connected to the explanation assisting system 1.

Using a keyword included in voice words that are obtained from the analysis by the voice analysis unit 7 and obtained before the question is received from the question input unit 13, the output control unit 9 reads explanation information associated with the keyword from the explanation material storage unit 3 and outputs the explanation information to an audience terminal 11.

For example, when an input unit of the audience terminal inputs "?" into the audience terminal, information on the question is transferred to the system 1. The system receiving the information on the question then analyzes a voice word that corresponds to a keyword out of voice words prior to a timing at which the system receives the information on the question. The system then reads the analyzed keyword and outputs explanation information (e.g., a page or an explanatory text in a presentation) associated with the keyword to the audience terminal 11. Thus, it is possible to display a commentary about a point in question on an audience terminal with a question, without receiving a specific question. With this configuration, it will be possible to reexplain a part about which an audience member has a question in a customized manner without interrupting a flow of an explanation in a lecture or a presentation as a whole. Furthermore, by storing the information on the question, it is possible to repeatedly review the part about which the audience terminal has the question.

The question may be a question that is output to the explanation assisting system 1 by touching or clicking on an icon associated with the question displayed on the audience terminal 11.

Alternatively, the question may be a question that is output to the explanation assisting system 1 by pressing any key (e.g., a "?" key) or any button (e.g., a question button) of an input device of the audience terminal 11.

With this configuration, it is not necessary for the audience terminal to input a question sentence to put a question, and it is possible to transfer a notice of a question to the system 1 by simply clicking on a question icon, touching a question icon on a touch panel, pressing "?" of a keyboard, or pressing a button of a dedicated input device.

The output explanation information storage unit 15 is an element for storing information about output explanation information that is explanation information output to an audience terminal 11.

The output explanation information output unit 17 is an element for reading output explanation information from the output explanation information storage unit 15 and outputting the output explanation information to an audience terminal 11 in response to a request from the audience terminal 11.

With this configuration, it will be possible to allow an audience member to review a point in question many times.

The evaluation information input unit 19 is an element for receiving evaluation information from an audience terminal 11. In this case, the output explanation information storage unit 15 preferably stores the evaluation information together with the output explanation information. In addition, the output explanation information output unit 17 preferably outputs the evaluation information together with the output explanation information.

With the evaluation information input unit 19, it is possible to store a part where an audience member who listens to a presentation makes an evaluation "Like!" and to easily browse the part where the audience member has made the evaluation "Like!" Thus, it is possible to quickly access a part that an audience member has found beneficial in a long presentation.

Furthermore, when a question is resolved, it will be possible for an audience member to issue a notification that the question has been resolved and also to make a review many times.

The audience attribute storage unit 21 is an element for storing an attribute of an audience member who has output evaluation information.

The evaluation analysis unit 23 is an element for analyzing an evaluation for each attribute based on attributes and evaluation information.

For example, it is possible to analyze and store an evaluation for each attribute such that the sixth slide is highly evaluated by a general practitioner, but the general practitioner is little interested in the first to fifth pages because the general practitioner has already known their details; in contrast, the second and third slides are highly evaluated by a doctor at a major hospital. Therefore, by collecting such information items, it is possible to propose a slide to be used, a slide to treat briefly, and the like in accordance with attributes of audience members.

The present description provides a program for causing a computer to function as the system described above and also provides a non-transitory computer readable recording medium that stores such a program.

Advantageous Effects of Invention

When an audience member has a question about a part in an explanation, this system can send, to the audience member, explanation information about a part previous to the part in the explanation about which the audience member has the question. That is, this system is a system that enables, when an audience member has a question, the audience member to give a simple indication of intention so as to obtain explanation information about the question, without interrupting an explanation by a talker.

BRIEF DESCRIPTION OF DRAWINGS

FIG. 1 is a block diagram of an explanation assisting system.

FIG. 2 is a flowchart for describing an explanation assisting method using a computer.

FIG. 3 is a conceptual diagram illustrating an example of the explanation assisting method using the computer.

FIG. 4 is a conceptual diagram illustrating an example of timings of a presentation and questions.

FIG. 5 is a conceptual diagram illustrating an example of association between questions and attributes.

DESCRIPTION OF EMBODIMENTS

An embodiment for practicing the present invention will be described below with reference to the drawings. The present invention is not limited to the embodiment described below but also includes modifications that are made by those skilled in the art as appropriate within a scope obvious to those skilled in the art from the following embodiment.

The present invention relates to an explanation assisting system 1. The explanation assisting system relates to a system for assisting an explanation given by an explainer (a lecturer, a presenter, a talker, an instructor, a speaker, a teacher, an MR, an explainer, a doctor, or a person who gives an explanation). This system is preferably for a plurality of audience members who listen to an explanation by an explainer (a plurality of terminals for the audience members). This system is a system based on a computer.

FIG. 1 is a block diagram of the explanation assisting system. As illustrated in FIG. 1, this system 1 includes an explanation material storage unit 3, a voice input unit 5, a voice analysis unit 7, an output control unit 9, and a question input unit 13. This system may further include at least any one of an output explanation information storage unit 15, an output explanation information output unit 17, an evaluation information input unit 19, an audience attribute storage unit 21, and an evaluation analysis unit 23. In addition, this system 1 is connected to one or more audience terminals 11 via a communication network such as a network so that the system 1 can exchange information with the one or more audience terminals 11.

The computer includes an input unit, an output unit, a control unit, a computation unit, and a storage unit, and the elements are connected together with a bus or the like so as to exchange information with one another. For example, the storage unit may store a control program and may store various types of information. When receiving predetermined information from the input unit, the control unit reads the control program stored in the storage unit. The control unit then reads information stored in the storage unit as appropriate and transfers the information to the computation unit. The control unit also transfers received information to the computation unit as appropriate. The computation unit performs computational processing using received various types of information and stores a computation result in the storage unit. The control unit reads the computation result stored in the storage unit and outputs the computation result through the output unit. Various types of processing and steps are executed in this manner. The various types of processing are executed by the units and means. The computer may be a computer including a processor that implements various functions and various steps.

The system according to the present invention may be a system that includes terminals connected to a network such as the Internet or an intranet and includes a server connected to the network. Naturally, a single computer or portable terminal may function as the system according to the present invention, or the system may include a plurality of servers. The elements will be described below.

The explanation material storage unit 3 is an element for storing an explanation material. The explanation material storage unit 3 further stores explanation information included in the explanation material in association with keywords. For example, the storage unit of the computer functions as the explanation material storage unit 3.

The voice input unit 5 is an element into which a voice is input. For example, the input unit (a microphone) of the computer functions as the voice input unit 5. In a case where a voice is recorded beforehand, an element that inputs the recorded voice into the system may function as the voice input unit. In this case, the storage unit, the control unit, and the computation unit function as the voice input unit.

The voice analysis unit 7 is an element for analyzing words included in a voice to obtain voice words. The voice input unit 5 inputs a voice into the system. The voice analysis unit 7 then analyzes words included in the voice and obtains voice words, which are words included in the voice. Such a voice analysis engine and a voice analysis program are known. The storage unit, the control unit, and the computation unit of the computer function as the voice analysis unit 7. The voice words obtained from the analysis by the voice analysis unit 7 are stored in the storage unit as appropriate.

The output control unit 9 is an element for outputting information to be displayed. The information to be displayed may be displayed on, for example, a display unit (a monitor) of the system. The information to be displayed may be displayed on, for example, a monitor of an audience terminal 11. For example, the storage unit, the control unit, the computation unit, and the output unit of the computer function as the output control unit 9. Using a keyword included in voice words that are obtained from the analysis by the voice analysis unit 7 and obtained before the question is received from the question input unit 13, the output control unit 9 reads explanation information associated with the keyword from the explanation material storage unit 3 and outputs the explanation information to an audience terminal 11. The audience terminal 11 displays the explanation information on its display unit. The question input unit 13, which will be described later, receives a question from an audience terminal 11 connected to the explanation assisting system 1. Then, the question (information on a notice of the question) is input into the system. The system concurrently analyzes a voice to obtain voice words. When the question is input, the system performs matching between keywords and voice words obtained until the question is input. The system then extracts a last keyword (or a second last or third last keyword) present before the question is input. The one or more extracted keywords are stored in the storage unit as appropriate. Using the one or more extracted keywords, the system reads explanation information associated with the one or more keywords from the explanation material storage unit 3. The system then outputs the read explanation information to the audience terminal 11.

The explanation information may be, for example, an explanatory text about each keyword, a presentation material that explains each keyword, a teaching material that gives a commentary on each keyword, or link information (e.g., a URL) for referring to an explanatory sentence about each keyword. The one or more extracted keywords may be combined with a system that looks up an associated word or topic. Such a system is, for example, a system including a dictionary of synonyms.

Another example of the explanation information may be based on a past question. In this example, a plurality of explanation information items are stored in association with a keyword. For example, assume that, in past presentations, an explanation information item A is selected in a presentation on one occasion, and an explanation information item B is selected in a presentation on another occasion, for some keyword at some timing on the tenth slide for the presentations. Then, when a question is input at a predetermined timing while the tenth slide of this presentation material is displayed, selection of the explanation information item A or the explanation information item B is expected. Therefore, when a question is input (e.g., someone in an audience presses "?"), the explanation information item A and the explanation information item B (or titles of the explanation information item A and the explanation information item B) may be displayed on a display unit of an audience terminal, and one of the explanation information item A and the explanation information item B selected by the audience terminal may be taken as the explanation information.

The question input unit 13 is an element for receiving a question from an audience terminal 11 connected to the explanation assisting system 1. After receiving the question, information about the question is input into the system.

The question may be a question that is output to the explanation assisting system 1 by touching or clicking on an icon associated with the question displayed on the audience terminal 11.

Alternatively, the question may be a question that is output to the explanation assisting system 1 by pressing any key (e.g., a "?" key) or any button (e.g., a question button) of an input device of the audience terminal 11.

The output explanation information storage unit 15 is an element for storing information about output explanation information that is explanation information output to an audience terminal 11. The storage unit of the computer functions as the output explanation information storage unit 15. The output explanation information storage unit 15 may store the output explanation information in association with, for example, information about an audience member (an ID or terminal information, etc.).

The output explanation information output unit 17 is an element for reading output explanation information from the output explanation information storage unit 15 and outputting the output explanation information to an audience terminal 11 in response to a request from the audience terminal 11. For example, the input unit, the control unit, the computation unit, and the output unit of the computer function as the output explanation information output unit 17. An audience terminal 11 outputs a transmission request for sending output explanation information. The output transmission request is input into the system 1. The output explanation information output unit 17 reads the output explanation information from the output explanation information storage unit 15 using information about an audience member. The output explanation information output unit 17 then outputs the read output explanation information to the audience terminal 11. The audience terminal 11 receives the output explanation information and performs display based on the explanation information, on a display unit of the audience terminal 11. The display unit may be a voice output unit and may be a unit that displays a voice (outputs a voice). In a case where a plurality of information items are assumed when "?" is pressed, the output explanation information may be changed by choosing which of the information items is to be learned.

The evaluation information input unit 19 is an element for receiving evaluation information from an audience terminal 11. For example, the input unit of the computer functions as the evaluation information input unit 19. From an input unit of the audience terminal 11, an evaluation (e.g., "Like") about an explanation such as a presentation is input into the audience terminal 11. The audience terminal 11 outputs information about the evaluation through its output unit. The output evaluation information is sent to the system via the network. The system receives the sent evaluation information and inputs the evaluation information into the system. The input unit of the computer functions as the evaluation information input unit 19.

The audience attribute storage unit 21 is an element for storing an attribute of an audience member who has output evaluation information. For example, the storage unit of the computer functions as the audience attribute storage unit 21. The audience member who has output evaluation information is, for example, a terminal that has output an evaluation "Like!" or a user of the terminal. The attribute means a social role of an individual (e.g., a doctor, a doctor at a major hospital, a hospital doctor, a general practitioner, a graduate student, a university student, a student, an instructor, a speaker, an associate professor, a professor, a supplemental school teacher, a sole proprietor, a company executive, an employee, an employer, etc.).

The evaluation analysis unit 23 is an element for analyzing an evaluation for each attribute based on attributes and evaluation information.

FIG. 2 is a flowchart for describing an explanation assisting method using the computer. As illustrated in FIG. 2, this method is an explanation assisting method using the computer and includes the following steps. A processor of the computer or the computer is, for example, one that causes the computer to perform the following steps.

A voice is input into the system (voice inputting step: S101).

The system analyzes words included in the input voice to obtain voice words (voice word obtaining step: S102).

The system receives a question (information about the question) output from an audience terminal 11 (question receiving step: S103).

The system compares voice words obtained until the question is received with keywords stored in (the explanation material storage unit 3 of) the system (keyword comparing step: S104).

The system extracts keywords each of which matches one of the compared voice words, to obtain extracted keywords (extracted keyword obtaining step: S105). The system extracts, from among the extracted keywords, an extracted keyword that is present previous to the reception of the question as an immediately-before-question extracted keyword.

Using the extracted keyword (the immediately-before-question extracted keyword, an extracted keyword being a quasicandidate), the system reads explanation information that is stored in (the explanation material storage unit 3 of) the system in association with the keyword (explanation information reading step: S106).

The system outputs the read explanation information to the audience terminal 11 (explanation information outputting step: S107).

The audience terminal 11 receiving the explanation information displays the explanation information on a display unit of the audience terminal (explanation information displaying step: S108).

Example 1

An example of the explanation assisting method will be described below. FIG. 3 is a conceptual diagram illustrating an example of the explanation assisting method using the computer.

Voice Inputting Step (S101)

The voice inputting step (S101) is a step in which a voice is input into the voice input unit 5 of the system.

For example, assume that a speaker is delivering a lecture to students online, using a presentation material. This lecture may be streamed live or may be recorded or videotaped.

Voice Word Obtaining Step (S102)

The voice word obtaining step (S102) is a step in which the voice analysis unit 7 of the system analyzes words included in the input voice to obtain voice words. For example, the voice analysis unit 7 analyzes the voice and obtains the following voice words.

"Diabetes is a disease characterized by a chronic state in which a glucose level or a hemoglobin A1c (HbA1c) value is higher than their appropriate values. Diabetes is caused by deficient or defective secretion of insulin, which delivers glucose in blood to cells. For example, you are diagnosed as having diabetes when your fasting glucose level measured in the morning is 126 mg/dl or higher, or when your glucose level is 200 mg/dl or higher regardless of whether you have had a meal. Diabetes develops into various diseases. Diabetes is classified into Type I and Type II. The respective remedies are medicine A, medicine B, and medicine C. Medicine C is contraindicated in a patient who is inoculated with medicine D . . . ."

Question Receiving Step (S103)

The question receiving step (S103) is a step in which the question input unit 13 of the system receives a question (information about the question) output from an audience terminal 11. For example, a display unit of the audience terminal displays an icon associated with a question. In a case where this display unit is a touch panel, touching the icon (e.g., "? icon") causes the question to be output from the audience terminal 11 to the system.

Keyword Comparing Step (S104)

The keyword comparing step (S104) is a step in which the output control unit 9 of the system compares voice words obtained until the question is received with keywords stored in the explanation material storage unit 3 of the system.

The explanation material storage unit 3 stores a plurality of keywords associated with the presentation and an explanation information item associated with each of the keywords.

For example, this storage unit 3 stores "contraindication," "medicine D," and "medicine C" as the keywords. The output control unit 9 compares the voice words with these keywords. Then, out of the voice words, "contraindication," "medicine D," and "medicine C" are present before a time point at which the question is input. The comparison between the keywords and the voice words is performed in this manner.

Extracted Keyword Obtaining Step (S105)

The extracted keyword obtaining step (S105) is a step in which the output control unit 9 of the system extracts keywords each of which matches one of the compared voice words, to obtain an extracted keyword. For example, in this step, "contraindication" is extracted as an immediately-before-question extracted keyword from among the voice words. In addition, "medicine D" and "medicine C" may be extracted as extracted keywords being quasicandidates from among the voice words. At this time, in addition to the immediately-before-question extracted keyword, a keyword that is second closest or third closest to the reception of the question, or the like may be extracted together as an extracted keyword being a quasicandidate. In addition, this extracted keyword may be displayed on the display unit of the audience terminal, allowing an audience member to select the extracted keyword. When selection information is input into the audience terminal, the selection information is input into the system 1, and an extracted keyword is determined. Furthermore, attributes of audience members and rates of adoption of past extracted keywords may be stored, and from a plurality of keywords taken as candidates, a candidate having a high rate of adoption may be determined as the extracted keyword with consideration given to an attribute of an audience member. In the example in FIG. 3, "medicine C," "medicine D," and "contraindication" are displayed on the audience terminal. Candidates for the extracted keyword may be displayed on the audience terminal in order of proximity of candidates for the extracted keyword to the time point at which the question is input ("contraindication," "medicine D," and "medicine C"). For example, the audience member selects the medicine D. Then, information on a notice that the medicine D has been selected is input into the audience terminal. The audience terminal transmits, to the system 1, the information on the notice that the medicine D has been selected. The system 1 then determines "medicine D" as the extracted keyword. The extracted keyword is obtained in this manner.

Explanation Information Reading Step (S106)

The explanation information reading step (S106) is a step in which, using the extracted keyword (the immediately-before-question extracted keyword, the extracted keyword being a quasicandidate), the output control unit 9 of the system reads explanation information that is stored in the explanation material storage unit 3 of the system in association with the keyword.

The explanation material storage unit 3 of the system stores explanation information items in association with keywords. Therefore, by using the extracted keyword, explanation information associated with the keyword can be read. For example, an explanatory text or a presentation material associated with the keyword "medicine D" is stored. The system reads this explanation information from the storage unit.

Explanation Information Outputting Step (S107)

The explanation information outputting step (S107) is a step in which the output control unit 9 of the system outputs the read explanation information to the audience terminal 11. The audience terminal 11 can receive the explanation information and display the explanation information on its display unit. In a case where the explanation information needs to be narrowed down more exactly, the keyword or a text including the keyword may be displayed for selection. In this step, a plurality of explanation information items may be read as candidates from the storage unit. Then, the plurality of explanation information items or information about the plurality of explanation information items (titles, etc.) may be transmitted to the audience terminal 11. Examples of the plurality of explanation information items include a presentation material about "medicine D," a PDF document about "medicine D," an explanation text about "medicine D," "Effect of medicine D," and "Commentary on medicine D." As seen above, the plurality of explanation information items may include types or titles of the explanation information items. Then, the display unit of the audience terminal 11 displays the plurality of explanation information items or the plurality of explanation information items (titles, etc.). The audience terminal 11 then selects any one of the explanation information items. Thus, the display unit of the audience terminal 11 displays the selected explanation information item. In addition, the selection of the explanation information item is input into the audience terminal 11 and output to the system. The system receiving this information may output the selected explanation information item to the audience terminal.

Explanation Information Displaying Step (S108)

The audience terminal 11 receiving the explanation information displays the explanation information on the display unit of the audience terminal.

Example 2

FIG. 4 is a conceptual diagram illustrating an example of timings of a presentation and questions.

A typical webinar does not receive in-progress evaluations. Therefore, the sense of participation of an audience may be poor, and many of the audience may leave the seminar.

With this system, it is possible to grasp that an audience member has made a question in a middle of a webinar. For example, this system counts questions in real time. Then, the system displays the counted number of questions on a display unit of a presenter. In a preferable mode, the number of questions summed up in some presentation may be displayed as well. Thus, the presenter can make the presentation while grasping whether the presentation provided by the presenter is understood by an audience. For example, when there are many questions, the presenter can raise understanding or a degree of satisfaction of the audience by making the presentation slowly using plain words or skipping a slide that is difficult to understand. That is, by collecting questionnaires in the presentation and receiving evaluations while making the presentation, it is possible to make the presentation with a high degree of understanding and a high degree of satisfaction.

Example 3

FIG. 5 is a conceptual diagram illustrating an example of association between questions and attributes. In this example, audience terminals each make an evaluation (understanding). For example, each audience terminal can output an evaluation such as "Like" to the system in a presentation. For example, the system is configured to grasp attributes of audience members who operate the audience terminals. For example, identification information items on the audience terminals or identification information items on the audience members, and the attributes of the audience members are stored in the storage unit, and the system is configured to read the attributes of the audience members using the identification information items on the audience terminals or the identification information items on the audience members. In this manner, it is possible to visualize an analyzer used in a lecture meeting in real time. The system can count the number of likes (evaluations), calculate a cumulative value of the likes (evaluations), and display the number of likes (evaluations) and the cumulative value on a display unit of a presenter. Thus, the presenter finds that the presentation is positively evaluated and can make the presentation with confidence. In this manner, it is also possible to make the webinar interactive. In addition, it is possible to store a slide that has received responses (a slide that has received many evaluations) and a corresponding position in a voice of an explanation, for each attribute. Thus, in a case where an explanation is to be given to audience members of some attribute, it is possible to extract a slide that has been highly evaluated by an audience member of the attribute.

INDUSTRIAL APPLICABILITY

The present invention may be used in information industries.

The invention claimed is:

1. An explanation assisting system connected to an audience terminal, the explanation assisting system comprising:

at least one processor, and a memory storing instructions, wherein the instructions, when executed by the at least one processor, cause the system to:

store an explanation material;

receive a voice of an explainer during a presentation;

analyze words included in the voice to obtain a sequence of voice words;

store explanation information included in the explanation material in association with a keyword, receive a question from the audience terminal while the voice is being received;

store a rate of adoption of the keyword based on past selections made by audience members;

identify one or more candidate keywords included in the sequence of voice words that appeared within a predetermined time period immediately before reception of the question:

determine a selected keyword from the one or more candidate keywords based on the rate of adoption;

retrieve explanation information associated with the selected keyword; and output the explanation information to the audience terminal.

2. The explanation assisting system according to claim 1, wherein the question is one of:

a question that is output to the explanation assisting system by touching or clicking on an icon associated with a question displayed on the audience terminal; and a question that is output to the explanation assisting system by pressing any key or button of an input device of the audience terminal.

3. The explanation assisting system according to claim 1, wherein the instructions further cause the system to:

store information about explanation information output to the audience terminal; and in response to a request from the audience terminal, retrieve the explanation information which is stored in the system and output the retrieved explanation information to the audience terminal.

4. The explanation assisting system according to claim 3, wherein the instructions further cause the system to:

receive evaluation information from the audience terminal, and output the evaluation information together with the retrieved explanation information.

5. The explanation assisting system according to claim 1, wherein the instructions further cause the system to:

receive evaluation information from the audience terminal;

store attribute information of an audience member who has output the evaluation information; and analyze the evaluation information, evaluation for each attribute of the audience member.

6. The explanation assisting system according to claim 1, wherein the instructions further cause the system to:

present the one or more candidate keywords to the audience terminal, and determine the selected keyword based on a selection input from the audience terminal.

7. The explanation assisting system according to claim 1, wherein determining the selected keyword includes weighting each candidate keyword based on a temporal distance from the reception of the question.

8. The explanation assisting system according to claim 1, wherein the instructions further cause the system to:

associate the sequence of voice words with a presentation slide being displayed, and identify the candidate keywords based on the presentation slide.

9. The explanation assisting system according to claim 1, wherein the rate of adoption is calculated for each attribute of audience members.

10. The explanation assisting system according to claim 1, wherein the instructions further cause the system to:

output a plurality of explanation information items corresponding to the candidate keywords to the audience terminal.

11. The explanation assisting system according to claim 1, wherein the instructions further cause the system to:

update the candidate keywords in real time as the voice is received.

12. A non-transitory computer-readable medium storing instructions that, when executed by at least one processor, cause the processor to perform a method for assisting an explanation, the method comprising:

storing an explanation material;

receiving a voice of an explainer during a presentation;

analyzing words included in the voice to obtain a sequence of voice words;

storing explanation information included in the explanation material in association with a keyword;

receiving a question from the audience terminal while the voice is being received;

storing a rate of adoption of the keyword based on past selections made by audience members;

identifying one or more candidate keywords included in the sequence of voice words that appeared within a predetermined time period immediately before reception of the question;

determining a selected keyword from the one or more candidate keywords based on the rate of adoption;

retrieving explanation information associated with the selected keyword; and outputting the explanation information to the audience terminal.

* * * * *